US007487949B2

(12) United States Patent
Bennett

(10) Patent No.: US 7,487,949 B2
(45) Date of Patent: Feb. 10, 2009

(54) CONCRETE DOWEL VOID FORMER

(75) Inventor: Clifford D. Bennett, Alta Loma, CA (US)

(73) Assignee: Dayton Superior Corporation, Dayton, OH (US)

( * ) Notice: Subject to any disclaimer, the term of this patent is extended or adjusted under 35 U.S.C. 154(b) by 845 days.

(21) Appl. No.: 10/729,763

(22) Filed: Dec. 5, 2003

(65) Prior Publication Data

US 2004/0111992 A1 Jun. 17, 2004

Related U.S. Application Data

(60) Provisional application No. 60/431,532, filed on Dec. 6, 2002.

(51) Int. Cl.
*B28B 7/34* (2006.01)
*B29C 33/76* (2006.01)

(52) U.S. Cl. ......................... 249/61; 249/177; 249/183; 264/317

(58) Field of Classification Search ................. 249/183, 249/177, 178, 179, DIG. 2, 63, 64, 175, 176; 52/220.8; 264/313, 317, 334, 337
See application file for complete search history.

(56) References Cited

U.S. PATENT DOCUMENTS

| | | | | | |
|---|---|---|---|---|---|
| 725,038 | A | * | 4/1903 | Cadwell | 249/179 |
| 1,396,280 | A | * | 11/1921 | Paine | 249/177 |
| 1,398,236 | A | * | 11/1921 | Meyer | 249/179 |
| 1,406,577 | A | * | 2/1922 | Murray | 249/175 |
| 1,482,565 | A | * | 2/1924 | Johnson et al. | 249/177 |
| 1,603,245 | A | * | 10/1926 | Pederson | 52/220.8 |
| 1,954,788 | A | * | 4/1934 | Chambliss, Jr. et al. | 249/177 |
| 2,488,816 | A | * | 11/1949 | Heaton | 52/220.8 |
| 3,020,615 | A | * | 2/1962 | Peters | 249/175 |
| 3,265,349 | A | * | 8/1966 | Hamrick | 249/177 |
| 3,933,336 | A | * | 1/1976 | Tolf, Jr. | 249/177 |
| 4,515,271 | A | * | 5/1985 | Auciello et al. | 249/183 |
| 4,779,738 | A | | 10/1988 | Akutsu et al. | |
| 5,072,911 | A | * | 12/1991 | Logsdon | 249/178 |
| 5,390,465 | A | * | 2/1995 | Rajecki | 52/220.8 |
| 6,193,209 | B1 | | 2/2001 | Bergman | |

* cited by examiner

*Primary Examiner*—Michael Safavi
(74) *Attorney, Agent, or Firm*—Thompson Hine LLP

(57) ABSTRACT

A void former or dowel sleeve adapted to be encapsulated in a hardened mass of concrete, which is collapsible upon the application of a tensile force longitudinally thereof to remove the void former from the concrete and provide a void for a load transferring dowel.

21 Claims, 2 Drawing Sheets

CONCRETE DOWEL VOID FORMER

This application claims priority to U.S. Provisional Patent Application Ser. No. 60/431,532 filed Dec. 6, 2002, the disclosure of which is incorporated by reference herein in its entirety.

FIELD OF THE INVENTION

The present invention pertains to concrete construction, and more particularly to an apparatus for creating a void in a concrete slab.

BACKGROUND OF THE INVENTION

The construction of various concrete surfaces is typically accomplished by forming a plurality of adjacent concrete slabs separated by expansion joints. When the concrete surfaces are used to support heavy loads, such as those surfaces used as aircraft runways, taxiways, and parking aprons, the heavy loads supported by the concrete surface may cause vertical movement of adjacent slabs.

To control relative movement between adjacent slabs and more evenly distribute loads among the slabs, it is common to provide load bearing dowels which extend between adjacent slabs and across the expansion joints. Various methods of installing the dowels between joints have been used.

According to a first, more or less conventional method, wet concrete is poured into a slab form and allowed to cure. The form is then removed and holes are drilled into the sides of the slab, generally parallel to an upper surface of the slab. After the holes have been drilled, first ends of the dowels are coated with an epoxy and inserted into the drilled holes. The opposite ends of the dowels extend outwardly from the slab into an area adjacent the slab, where additional concrete is poured to cover the outwardly extending ends of the dowels and thereby create an adjacent slab.

U.S. Pat. No. 5,674,028 discloses a second, improved method of installing dowels between adjacent slabs. As seen in this patent, plastic sleeves are inserted into the edges of concrete slabs after the forms are removed, but while the concrete is still relatively plastic. After the concrete hardens, dowels are inserted into the sleeves with an end of each of the dowels projecting outwardly. Thereafter, an adjacent slab is poured, embedding the outwardly projecting ends of the dowels and completing the joint.

Dowel placement sleeves are also described in U.S. Pat. Nos. 5,005,331; 5,216,862, and 5,487,249. In constructions of this type the sleeves are removed after the concrete is hardened. In the '862 patent, for example, it is disclosed that a sleeve may be tapered to facilitate extraction. While this type of sleeve may be relatively easily removed from the void it creates after an initial longitudinal displacement of the sleeve has been effected, a significant amount of force may still be required to break the sleeve free from the cured concrete and obtain that initial displacement.

The prior methods described above have various drawbacks. For example, drilling holes for receiving the dowels after the concrete has cured is a labor-intensive and time consuming process. Furthermore, without adequate controls, the holes drilled into the concrete may not be properly aligned with the top surface of the concrete slab or the edge into which the holes are drilled. Such misalignment may restrict relative movement between the slabs to a point which hinders performance of the expansion joint. While forming voids in the concrete by means of removable sleeves has advantages, it is often difficult, as noted above, to remove the sleeves from the concrete after the concrete slab has cured.

There is thus a need for a device which may be used to form voids in concrete slabs while the concrete is in a plastic state and which overcomes various drawbacks of the prior art, such as those described above.

SUMMARY OF THE INVENTION

The present invention provides a void former or dowel sleeve that may be completely and easily removed from a concrete slab or the like after the concrete has hardened to provide an opening or void to receive a load-transmitting dowel. The void former or sleeve may either be inserted into an edge of a concrete slab or other structure after the form has been removed but while the concrete is in a plastic state, or attached to an inner surface of a form and the concrete poured over and around it. In either case, once the concrete has hardened, the void former or sleeve can be easily removed from the hardened concrete by simply imparting a tensile force to its outer end. This will cause the void former or sleeve to collapse inwardly upon itself, thereby reducing its diameter to a dimension substantially less than that of the void it has formed, and allowing it to be completely and easily removed from the hardened concrete slab or other structure. In accordance with the present invention this is accomplished by injection molding the void former or sleeve with a closed inner end and a flanged outer end, with the body of the void former or sleeve provided on its inner surface with a groove extending spirally about the inner wall of the void former or sleeve. The groove does not extend completely through the wall of the void former or sleeve, but stops just short of the outer surface. This provides a smooth outer surface and a thin bridge of material over the spiral groove. As a consequence, the void former or sleeve possesses sufficient rigidity for handling and placement, while at the same time, furnishing a readily rupturable section when exposed to the proper forces. More specifically, when it is desired to remove the void former or sleeve from a hardened concrete slab or the like, a tensile force, acting substantially longitudinally of the void former or sleeve, is applied to its flanged end. This tensile force is transmitted as a shear force normal to the thin web bridging the spiral groove and thereby permitting the void former or sleeve to be collapsed inwardly.

In other words, the longitudinal tensile force applied to the outer end of the void former or sleeve, tends to elongate it. As a result, the void former or sleeve, tends to contract in diameter. This brings a shear force to bear transversely of the wall of the void former, rupturing the wall at its weakest point, and resulting in further contraction to a size permitting ready withdrawal from the slab.

The features and objectives of the present invention will become more readily apparent from the following Detailed Description taken in conjunction with the accompanying drawings.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION

Figure 1:
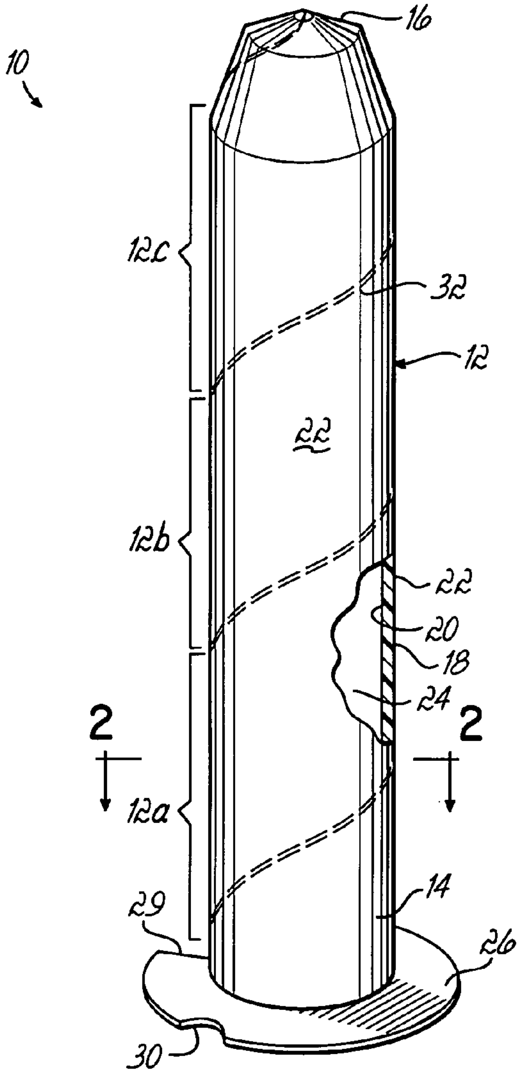
FIG. 1 is a perspective view of an exemplary concrete dowel void former, according to the present invention.

Referring to FIG. 1, there is shown an exemplary concrete dowel void former 10 of the present invention. The void former 10 has an elongate tubular body 12 with a first, open end 14 and a second, closed end 16. The second end 16 of the body 12 may be tapered to facilitate insertion of the void former 10 into a slab of plastic concrete. The body 12 comprises a body wall 18 having an inner surface 20 and an outer surface 22. An interior cavity 24 extends, along the body 12 between the first and second ends 14, 16. A spiral groove 32 is formed in the inner surface 20 of body wall 18 and extends from the first end 14 toward the second end 16. In the exemplary embodiment shown, groove 32 extends around the circumference of the body 12 in a helical fashion, defining adjacent spiral-wound portions 12*a*, 12*b*, 12*c* of the body 12, between successive turns of the groove 32.

Figure 2:
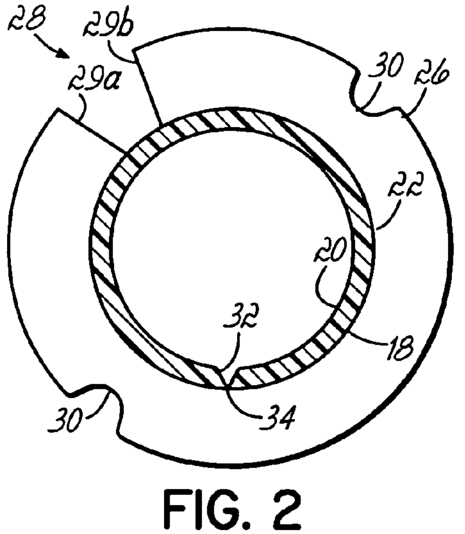
FIG. 2 is a partial cross-sectional view of the void former of FIG. 1, taken along line 2-2.
Figure 2A:
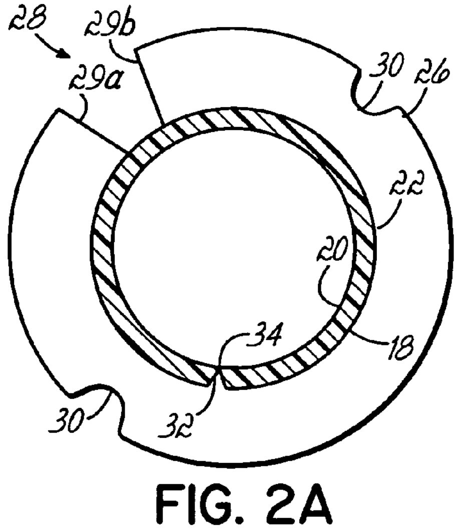
FIG. 2A is a partial cross-sectional view similar to FIG. 2, depicting another embodiment of the void former.

Referring to FIG. 2, there is shown a partial section of the void former 10 illustrating the groove 32 formed in the inner wall 20 of body wall 18. In the exemplary embodiment shown, groove 32 is defined as a v-shaped cross section formed into the inner surface 20 of the body wall 18, but it will be understood that groove 32 may have other shapes and configurations. In an exemplary embodiment, groove 32 is formed from the inner surface 20 toward the outer surface 22, but does not completely extend through the thickness of body wall 18. Advantageously, a thin web of material 34 is retained between the groove 32 and the outer surface 22 to provide rigidity to the body 12. In another embodiment, shown in FIG. 2A, the groove 32 is formed from the outer surface 22 toward the inner surface 20.

Figure 3A:
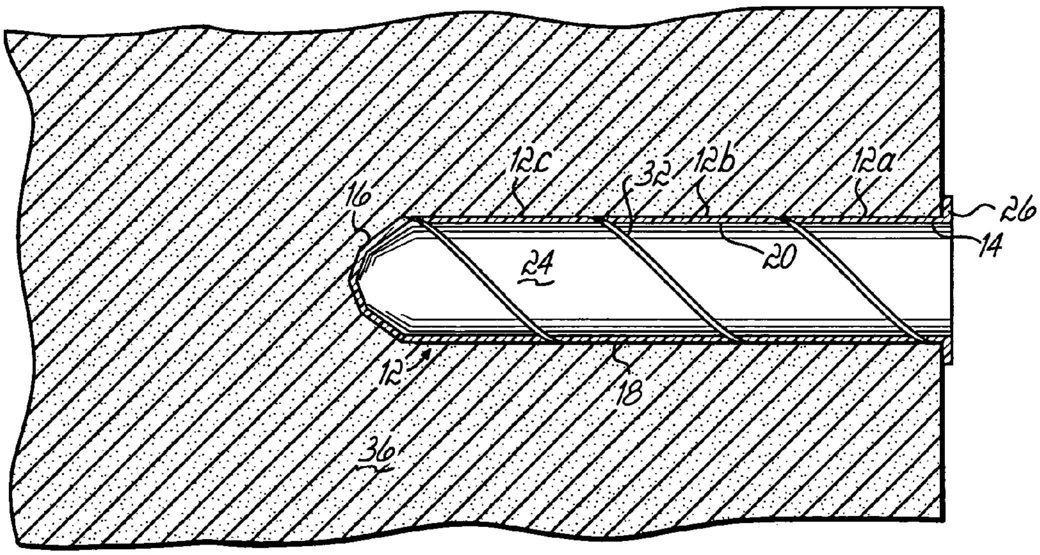
FIGS. 3A-3B are cross-sectional views depicting operation of the void former.
Figure 3B:
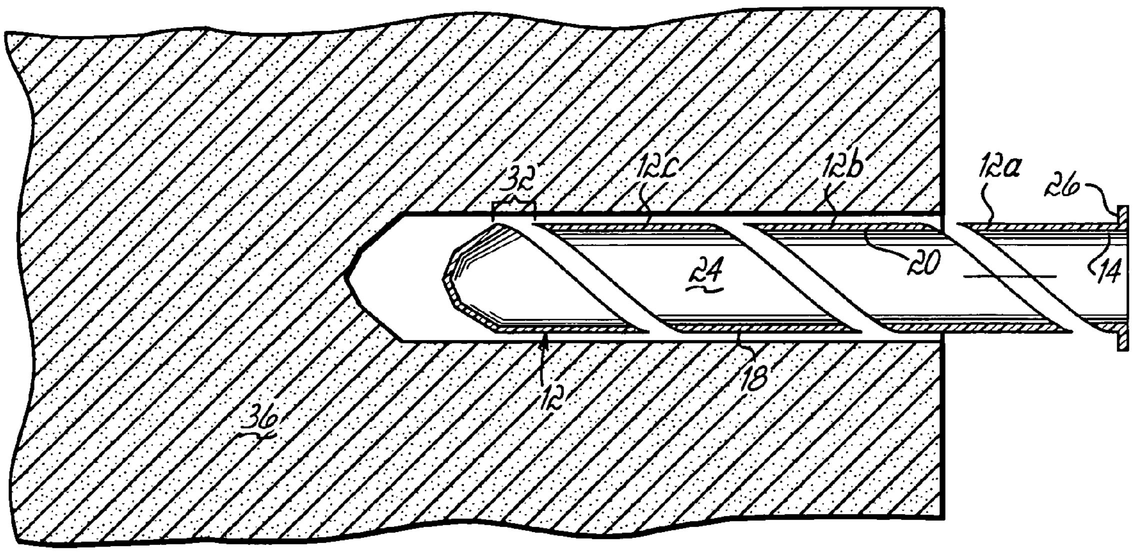

Advantageously, groove 32 permits the void former 10 to collapse inward when a tensile or torsional force is applied to the first end 14 of the body 12. This collapsing action of void former 10 may be best understood with reference to FIGS. 3A-3B. Specifically, when a tensile force is applied to first end 14 of void former 10 while void former 10 is otherwise gripped within a void in a concrete slab 36, adjacent spiral-wound portions 12*a*, 12*b*, 12*c* of the body 12 defined by groove 32 become separated as body 12 assumes an increasingly elongated shape under the tensile force. As body 12 increases in length, it also undergoes a reduction in outer diameter whereby outer surface 22 is urged in a direction away from the concrete wall defining the void formed in the concrete slab 36.

When groove 32 does not extend fully through body wall 18 and a tensile force is applied to the first end 14, the configuration of the spiral groove 32 creates shearing forces in a direction transverse to the thin web of material 34. Advantageously, the thickness of the web 34 between the groove 32 and outer surface 22 may be configured such that the shear forces rupture the web 34 when a desired tensile force is applied to the first end 14 of the body 12. After the web 34 has ruptured, the unrestrained groove 32 facilitates collapsing of the body 12 inward to make removal of the void former 10 easier. Because void former 10 can collapse inwardly to facilitate removal from cured concrete, the outer surface 22 of the body 12 can be formed without a taper along its length so that substantially cylindrical voids may be formed in the slab.

Void former 10 further includes a flange 26 disposed at the first end 14. Flange 26 extends in a generally radially outward direction from the body 12 and circumscribes a portion of the first end 14. In the exemplary embodiment shown, a notch 28 in the flange 26 is located proximate outer terminus of groove 32, with side edges 29*a*, 29*b* lying on opposite sides of the terminus of the groove 32. Flange 26 may be provided with additional notches or apertures 30 configured to receive fasteners (not shown) for securing void former 10 to a concrete form, or to facilitate grasping flange 26 to thereby apply a tensile force and/or torque to first end 14.

In use, void former 10 may be used to create voids in concrete slabs for receiving dowels. In this regard, a series of void formers 10 may be secured to an inner surface of a concrete form to face inward of an area for receiving poured, wet concrete. The poured concrete surrounds the void former 10. Once the concrete has cured, the forms may be removed and the void formers, still attached to the form, will be withdrawn from the slab as described above, to expose the voids.

In another exemplary embodiment, void former 10 may be inserted into a concrete preformed concrete slab, while the concrete is still in a plastic state. After the concrete has cured, void former 10 may be removed as described above to expose the void. A dowel may then be inserted into the void and concrete poured into an adjacent area to create an adjacent slab.

While the present invention has been illustrated by the description of the various embodiments thereof, and while the embodiments have been described in considerable detail, it is not intended to restrict or in any way limit the scope of the appended claims to such detail. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of Applicant's general inventive concept.

What is claimed is:

1. A void former, comprising:

an elongate tubular body having a closed inner end and an open outer end;

a wall of said body defined by coextensive inner and outer surfaces;

a groove formed in said wall and extending from one of said inner and outer surfaces thereof toward, but not through, the other of said inner and outer surfaces, such that a web of material substantially thinner than said wall is retained between said groove and the other of said inner and outer surfaces;

a flange circumscribing a portion of the periphery of said elongate tubular body at said open outer end and extending radially outwardly therefrom so as to facilitate grasping of the flange prior to removal from a concrete void; and a slot formed in said flange and having side edges positioned on opposite sides of said groove, wherein said groove extends along said body and terminates within the slot;

said web being configured to both rupture and permit said body to collapse inwardly in response to a grasping force applied to said flange and directed longitudinally away from said elongate tubular body.

2. The void former of claim 1, wherein said groove extends spirally along and about said body.

3. The void former of claim 2, wherein said groove is formed in said inner surface of said body.

4. The void former of claim 3, wherein said outer surface of said body is substantially smooth.

5. The void former of claim 1, wherein said closed inner end is tapered to facilitate insertion into plastic concrete.

6. The void former of claim 5, wherein said elongate tubular body is formed without a taper along a substantial majority of its length.

7. A void former comprising:

an elongate tubular body having a closed inner end and an open outer end;

a wall of said body defined by coextensive inner and outer surfaces;

a groove formed in said wall and extending from one of said inner and outer surfaces thereof toward, but not through, the other of said inner and outer surfaces, such that a web of material substantially thinner than said wall is retained between said groove and the other of said inner and outer surfaces;

a flange circumscribing a portion of the periphery of said elongate tubular body at said open outer end and extending radially outwardly therefrom so as to facilitate grasping of the flange prior to removal from a concrete void; and a mass of plastic concrete having an outer surface;

said web being configured to both rupture and permit said body to collapse inwardly in response to a grasping force applied to said flange and directed longitudinally away from said elongate tubular body; and said body being positioned in said mass with said open end positioned adjacent said outer surface of said mass and said flange positioned in contact with said outer surface.

8. The void former of claim 7, wherein:

said mass has an upper surface substantially normal to said outer surface thereof, and said elongate tubular body extends substantially parallel to said upper surface.

9. The void former of claim 7, further comprising:

a slot formed in said flange and having side edges positioned on opposite sides of said groove, wherein said groove extends along said body and terminates within the slot.

10. The void former of claim 7, wherein said groove extends spirally along and about said body.

11. The void former of claim 10, wherein said groove is formed in said inner surface of said body.

12. The void former of claim 11, wherein said outer surface of said body is substantially smooth.

13. The void former of claim 7, wherein said closed inner end is tapered to facilitate insertion into plastic concrete.

14. The void former of claim 13, wherein said elongate tubular body is formed without a taper along a substantial majority of its length.

15. In combination with a mass of plastic concrete having an upper surface and an edge surface extending substantially perpendicularly to said upper surface, the improvement comprising:

an elongate tubular body having a closed inner end and an open outer end, said body being received in said mass with said outer end positioned at said edge surface of said mass and said body extending substantially parallel to said upper surface of said mass;

a wall of said body defined by coextensive inner and outer surfaces;

a groove formed in said wall and extending from one of said inner and outer surfaces to but not through, the other of said inner and outer surfaces such that a web of material substantially thinner than said wall bridges said groove; and a flange generally circumscribing the periphery of said elongate tubular body at said open outer end and projecting perpendicularly outwardly therefrom, said flange being in overlapping contact with said edge surface of said mass;

said web being configured to both rupture and permit said body to collapse inwardly in response to a grasping force applied to said flange and directed longitudinally away from said elongate tubular body.

16. The combination of claim 15, wherein said groove extends spirally along and about said body.

17. The combination of claim 15, wherein said closed inner end is tapered to facilitate insertion into plastic concrete.

18. The combination of claim 15, further comprising:

a slot formed in said flange and having side edges positioned on opposite sides of said groove, wherein said groove extends along said body and terminates within the slot.

19. The combination of claim 17, wherein said elongate tubular body is formed without a taper along a substantial majority of its length so as to form a substantially cylindrical void in said mass.

20. The void former of claim 16, wherein said groove is formed in said inner surface of said body.

21. The void former of claim 20, wherein said outer surface of said body is substantially smooth.

* * * * *

UNITED STATES PATENT AND TRADEMARK OFFICE

CERTIFICATE OF CORRECTION

PATENT NO. : 7,487,949 B2
APPLICATION NO. : 10/729763
DATED : February 10, 2009
INVENTOR(S) : Clifford D. Bennett It is certified that error appears in the above-identified patent and that said Letters Patent is hereby corrected as shown below:

Column 6

Line 16, Insert -- , -- after “surfaces”.

Signed and Sealed this

Fourth Day of August, 2009

JOHN DOLL

*Acting Director of the United States Patent and Trademark Office*